US012335043B2

(12) United States Patent
Khare et al.

(10) Patent No.: US 12,335,043 B2
(45) Date of Patent: Jun. 17, 2025

(54) METHOD, APPARATUS AND COMPUTER PROGRAM FOR CONFIGURING ONE OR MORE PARAMETERS ASSOCIATED WITH A NETWORK FUNCTION

(71) Applicant: NOKIA TECHNOLOGIES OY, Espoo (FI)

(72) Inventors: Saurabh Khare, Bangalore (IN); Rajesh Babu Natarajan, Bangalore (IN); Konstantinos Samdanis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 346 days.

(21) Appl. No.: 17/889,855

(22) Filed: Aug. 17, 2022

(65) Prior Publication Data

US 2023/0065199 A1    Mar. 2, 2023

(30) Foreign Application Priority Data

Aug. 19, 2021    (IN) .............................. 202141037620

(51) Int. Cl.
*H04L 1/1607*    (2023.01)
*H04W 24/08*    (2009.01)
(52) U.S. Cl.
CPC .......... *H04L 1/1678* (2013.01); *H04W 24/08* (2013.01)
(58) Field of Classification Search
None
See application file for complete search history.

(56) References Cited

U.S. PATENT DOCUMENTS

2022/0386225 A1*  12/2022  Sapra ...................... H04L 67/51
2023/0188449 A1*  6/2023  Mirsky ................... H04L 12/12
                                                          370/241

OTHER PUBLICATIONS

3GPP TS 29.500 V17.3.0 (Jun. 2021), Technical Specification, 3rd Generation Partnership Project; Technical Specification Group Core Network and Terminals; 5G System; Technical Realization of Service Based Architecture; Stage 3 (Release 17), Jun. 2021.
3GPP TS 24.501 V17.3.1 (Jun. 2021), Technical Specification, 3rd Generation Partnership Project; Technical Specification Group Core Network and Terminals; Non-Access-Stratum (NAS) protocol for 5G System (5GS); Stage 3 (Release 17), Jun. 2021.
3GPP TS 28.552 V17.3.1 (Jun. 2021), Technical Specification, 3rd Generation Partnership Project; Technical Specification Group Services and System Aspects; Management and orchestration; 5G performance measurements (Release 17), Jun. 2021.

(Continued)

*Primary Examiner* — Christine T Duong
(74) *Attorney, Agent, or Firm* — SQUIRE PATTON BOGGS (US) LLP

(57) ABSTRACT

There is provided an apparatus comprising means for receiving, at an analytics function from a first network function, a request for one or more timer adjustments for at least one timer associated with one or more network functions; obtaining, by the analytics function from one or more further network functions, one or more input parameters relating to network behaviour; and sending, from the analytics function to the first network function, an output comprising one or more timer adjustments for the at least one timer, wherein the output is based on the obtained one or more input parameters.

16 Claims, 5 Drawing Sheets

(56) References Cited

OTHER PUBLICATIONS

3GPP TS 28.554 V17.3.0 (Jun. 2021), Technical Specification, 3rd Generation Partnership Project; Technical Specification Group Services and System Aspects; Management and orchestration; 5G end to end Key Performance Indicators (KPI) (Release 17), Jun. 2021.
3GPP TS 23.288 V17.1.0 (Jun. 2021), Technical Specification, 3rd Generation Partnership Project; Technical Specification Group Services and System Aspects; Architecture enhancements for 5G System (5GS) to support network data analytics services (Release 17), Jun. 2021.

* cited by examiner

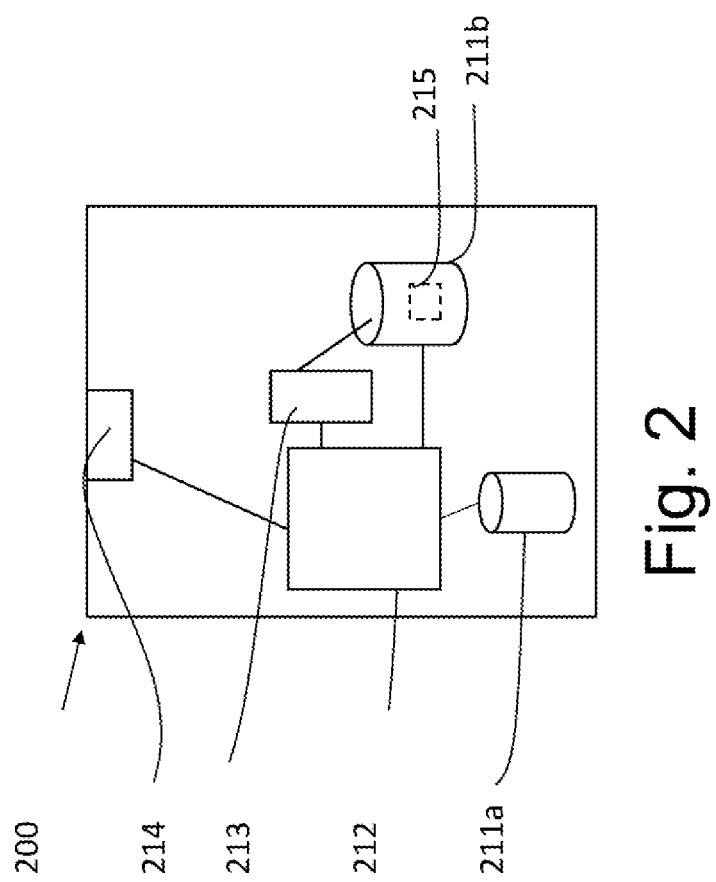

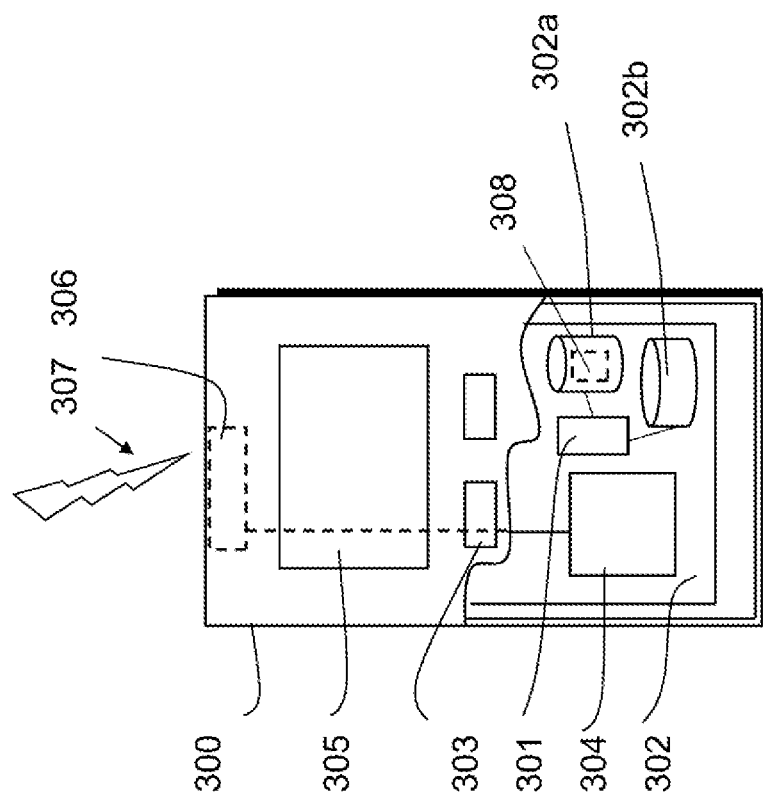

METHOD, APPARATUS AND COMPUTER PROGRAM FOR CONFIGURING ONE OR MORE PARAMETERS ASSOCIATED WITH A NETWORK FUNCTION

CROSS REFERENCE TO RELATED APPLICATION

This application claims the benefit of Indian Application No. 202141037620, filed Aug. 19, 2021. The entire content of the above-referenced application is hereby incorporated by reference.

FIELD

The present application relates to a method, apparatus, and computer program and in particular but not exclusively to configuring one or more timers associated with a network function.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving, at an analytics function from a first network function, a request for one or more timer adjustments for at least one timer associated with one or more network functions; obtaining, by the analytics function from one or more further network functions, one or more input parameters relating to network behaviour; and sending, from the analytics function to the first network function, an output comprising one or more timer adjustments for the at least one timer, wherein the output is based on the obtained one or more input parameters.

The one or more timer adjustments may comprise at least one of: one or more adjusted timer values; and one or more adjusted number of retry attempts for sending at least one message associated with the at least one timer.

The one or more further network functions may comprise one or more of: a network data analytics function; and a network management service.

The one or more input parameters may comprise at least one of: information indicating a network load; information indication a network slice load where a user equipment is attached; information indicating expected user equipment behaviour; information indicating a radio access node load; and information indicating an average number of failed attempts to send a message from a network function due to timeout.

The means may be for: performing analysis on the one or more input parameters to determine the one or more timer adjustments for the at least one timer.

The at least one timer may be configured on a network function type basis and/or an inter-site basis.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided an apparatus comprising means for: sending, from a first network function to an analytics function, a request for one or more timer adjustments for at least one timer associated with one or more network functions; receiving, at the first network function from the analytics function, an output comprising one or more timer adjustments for the at least one timer; and adjusting the at least one timer based on the received one or more timer adjustments for the at least one timer.

The one or more timer adjustments may comprise at least one of: one or more adjusted timer values; and one or more adjusted number of retry attempts for sending at least one message associated with the at least one timer.

The adjusting may comprise: sending, to at least one of the one or more network functions, configuration information comprising the one or more adjusted timer values and/or the one or more adjusted number of retry attempts for the at least one timer.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided an apparatus comprising at least one processor and at least one memory including a computer program code, the at least one memory and computer program code configured to, with the at least one processor, cause the apparatus at least to: receive, at an analytics function from a first network function, a request for one or more timer adjustments for at least one timer associated with one or more network functions; obtain, by the analytics function from one or more further network functions, one or more input parameters relating to network behaviour; and send, from the analytics function to the first network function, an output comprising one or more timer adjustments for the at least one timer, wherein the output is based on the obtained one or more input parameters.

The one or more timer adjustments may comprise at least one of: one or more adjusted timer values; and one or more adjusted number of retry attempts for sending at least one message associated with the at least one timer.

The one or more further network functions may comprise one or more of: a network data analytics function; and a network management service.

The one or more input parameters may comprise at least one of: information indicating a network load; information indication a network slice load where a user equipment is attached; information indicating expected user equipment behaviour; information indicating a radio access node load; and information indicating an average number of failed attempts to send a message from a network function due to timeout.

The at least one memory and at least one processor may be configured to cause the apparatus to perform analysis on the one or more input parameters to determine the one or more timer adjustments for the at least one timer.

The at least one timer may be configured on a network function type basis and/or an inter-site basis.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided an apparatus comprising at least one processor and at least one memory including a computer program code, the at least one memory and computer program code configured to, with the at least one processor, cause the apparatus at least to: send, from a first network function to an analytics function, a request for one or more timer adjustments for at least one timer associated with one or more network functions; receive, at the first network function from the analytics function, an output comprising one or more timer adjustments for the at least one timer; and adjust the at least one timer based on the received one or more timer adjustments for the at least one timer.

The one or more timer adjustments may comprise at least one of: one or more adjusted timer values; and one or more adjusted number of retry attempts for sending at least one message associated with the at least one timer.

The at least one memory and at least one processor may be configured to cause the apparatus to send, to at least one of the one or more network functions, configuration information comprising the one or more adjusted timer values and/or the one or more adjusted number of retry attempts for the at least one timer.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided a method comprising: receiving, at an analytics function from a first network function, a request for one or more timer adjustments for at least one timer associated with one or more network functions; obtaining, by the analytics function from one or more further network functions, one or more input parameters relating to network behaviour; and sending, from the analytics function to the first network function, an output comprising one or more timer adjustments for the at least one timer, wherein the output is based on the obtained one or more input parameters.

The one or more timer adjustments may comprise at least one of: one or more adjusted timer values; and one or more adjusted number of retry attempts for sending at least one message associated with the at least one timer.

The one or more further network functions may comprise one or more of: a network data analytics function; and a network management service.

The one or more input parameters may comprise at least one of: information indicating a network load; information indication a network slice load where a user equipment is attached; information indicating expected user equipment behaviour; information indicating a radio access node load; and information indicating an average number of failed attempts to send a message from a network function due to timeout.

The method may comprise: performing analysis on the one or more input parameters to determine the one or more timer adjustments for the at least one timer.

The at least one timer may be configured on a network function type basis and/or an inter-site basis.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided a method comprising: sending, from a first network function to an analytics function, a request for one or more timer adjustments for at least one timer associated with one or more network functions; receiving, at the first network function from the analytics function, an output comprising one or more timer adjustments for the at least one timer; and adjusting the at least one timer based on the received one or more timer adjustments for the at least one timer.

The one or more timer adjustments may comprise at least one of: one or more adjusted timer values; and one or more adjusted number of retry attempts for sending at least one message associated with the at least one timer.

The adjusting may comprise: sending, to at least one of the one or more network functions, configuration information comprising the one or more adjusted timer values and/or the one or more adjusted number of retry attempts for the at least one timer.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided a computer readable medium comprising program instructions for causing an apparatus to perform at least the following: receiving, at an analytics function from a first network function, a request for one or more timer adjustments for at least one timer associated with one or more network functions; obtaining, by the analytics function from one or more further network functions, one or more input parameters relating to network behaviour; and sending, from the analytics function to the first network function, an output comprising one or more timer adjustments for the at least one timer, wherein the output is based on the obtained one or more input parameters.

The one or more timer adjustments may comprise at least one of: one or more adjusted timer values; and one or more adjusted number of retry attempts for sending at least one message associated with the at least one timer.

The one or more further network functions may comprise one or more of: a network data analytics function; and a network management service.

The one or more input parameters may comprise at least one of: information indicating a network load; information indication a network slice load where a user equipment is attached; information indicating expected user equipment behaviour; information indicating a radio access node load; and information indicating an average number of failed attempts to send a message from a network function due to timeout.

The program instructions may cause the apparatus to perform: analysing on the one or more input parameters to determine the one or more timer adjustments for the at least one timer.

The at least one timer may be configured on a network function type basis and/or an inter-site basis.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided a computer readable medium comprising program instructions for causing an apparatus to perform at least the following: sending, from a first network function to an analytics function, a request for one or more timer adjustments for at least one timer associated with one or more network functions; receiving, at the first network function from the analytics function, an output comprising one or more timer adjustments for the at least one timer; and adjusting the at least one timer based on the received one or more timer adjustments for the at least one timer.

The one or more timer adjustments may comprise at least one of: one or more adjusted timer values; and one or more adjusted number of retry attempts for sending at least one message associated with the at least one timer.

The adjusting may comprise: sending, to at least one of the one or more network functions, configuration information comprising the one or more adjusted timer values and/or the one or more adjusted number of retry attempts for the at least one timer.

The one or more network functions may comprise a chain of network functions.

The chain of network functions may comprise a plurality of network functions associated with a network procedure.

The request for analytics may comprise at least one of: information identifying a service flow associated with a network procedure, the network procedure including the one or more network functions; information identifying the one or more network functions; information identifying a range of the at least one timer; information identifying a range of retry attempts for at least one message associated with the network procedure; information identifying a type of user equipment associated with the network procedure; information identifying a number of retry attempts at a network function; information identifying at least one of a route failure, a site failure, or a network function failure; and information identifying one or more overloaded network functions or overloaded sites key performance indices.

The at least one timer may comprise at least one of: a timeout timer; and a retry timer.

The first network function may be an operations, administration and management function.

The output may comprise at least one of: information indicating one or more scenarios where the one or more timer adjustments for the at least one timer are applicable; information indicating a time and/or day where the one or more timer adjustments for the at least one timer are applicable; and information indicating a degree of confidence that the one or more timer adjustments for the at least one timer are within an indicated range.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 2 shows a representation of a control apparatus according to some example embodiments;

FIG. 3 shows a representation of an apparatus according to some example embodiments;

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
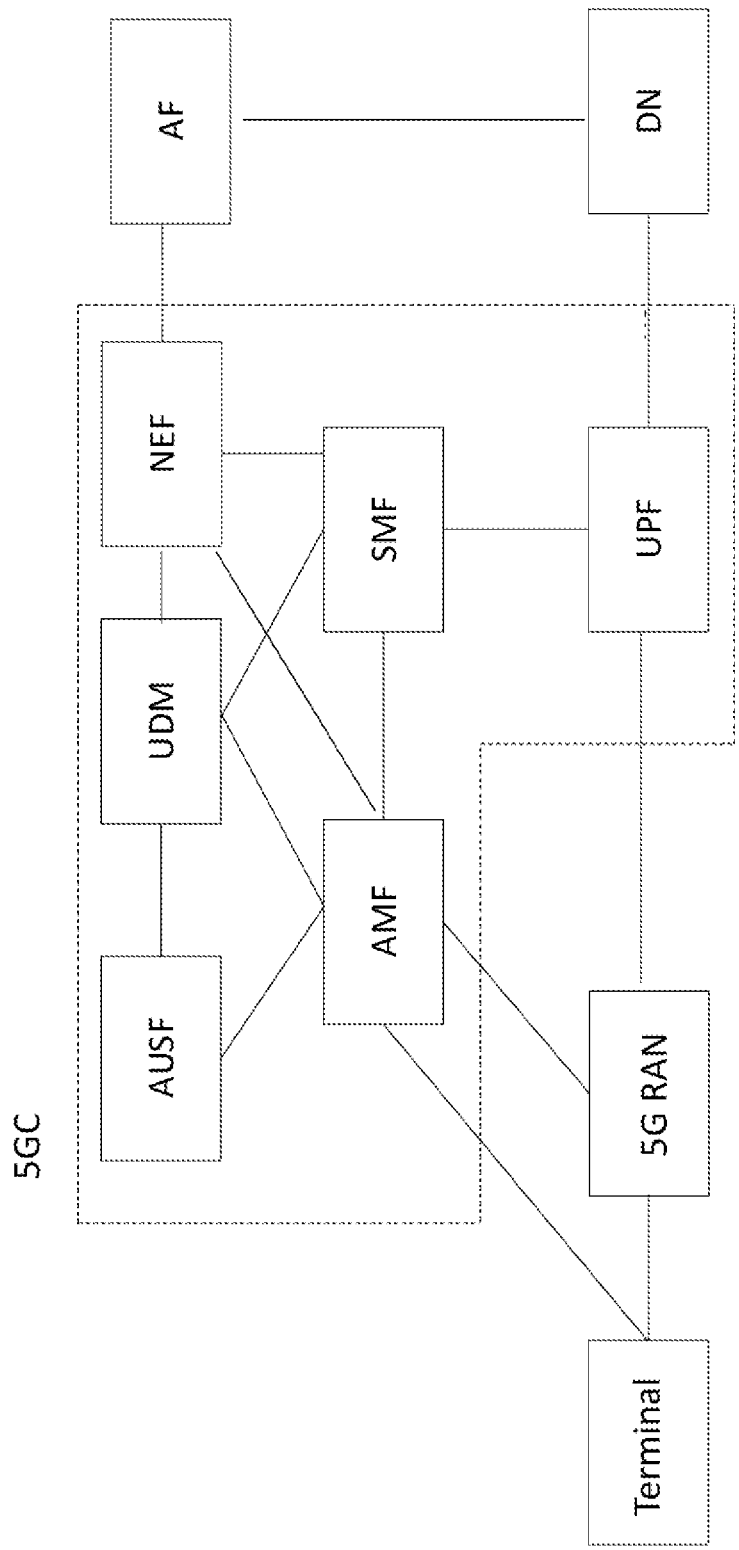
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In 5G networks, various timers may be used to help control various procedures and services. For example, section 10.2 of TS 24.501 defines timers relating to 5G mobility management. The timers may for example be implemented at the UE (as per table 10.2.1 of TS 24.501) or at the network, for example at the AMF (as per table 10.2.2 of TS 24.501). Other examples of timers include timers relating to 5G session management, such as those defined in section 10.3 of TS 24.501, which defines timers implemented at the UE (as per table 10.3.1) and the SMF (as per table 10.3.2). It should be understood that various other timers may be used for different applications, and that the present disclosure is not limited to specific timers.

In general, a value of a timer may be determined by the network and may be assigned to the UE by the network. In some examples, a timer may be associated with a procedure. Upon expiry of the timer, or after the timer has expired a certain number of times, the procedure may be aborted if the procedure has not been successfully completed.

Table 1 below shows some examples of different timers that a network function (NF) may be configured with. These may for example be transaction timers.

TABLE 1

| | |
|---|---|
| Transaction wait timer, e.g. 5 seconds | NF1 sends a service request to NF2 and starts this timer (for example 5 seconds). When the service request response is not received at this time (5 second), the timeout occurs at the NF1. NF1 may retry or reselect another NF at this point of time. |
| Retry count, e.g. 3 times | After timeout (after expiry of the Transaction wait timer), the NF1 may retry the same service request to the same NF2. As retry count is configure as 3, NF1 needs to perform a retry up to 3 times. |
| Retry timer, e.g. 3 second | NF1 sends a service request again to NF2 as a part of a retry attempt, therefore this time it will wait for 3 second to receive a response. If a response is not received, it is considered as a timeout. |

In the example of table 1, the first network function is configured with two timers. The first network function sends a service request to a second network function and starts a first timer (transaction wait timer). The first timer defines an amount of time that the first network function waits to receive a service request response from the second network function.

If, upon expiry of the first timer, no service request has been received from the second network function, the first network function may retry the procedure by sending another service request to the second network function or may select a different network function.

In the case where the first network function retries the procedure with the second network function. In this case, a second timer (retry timer) is defined, which defines an amount of time that the first network function waits to receive a service request response from the second network function when re-sending the service request. The value of the first timer and the second timer may be different. The retry count parameter may limit the number of times the first network function is allowed to retry the procedure with the second network function.

If no service request response is received from the second network function after expiry of the first timer, and subsequently expiry of the second timer for the number of attempts defined by the retry count parameter, then the procedure may be considered to have timed out.

Multiple NFs may be involved in a single call, such as an Authentication call. In some examples there may be a number of options for a retry attempt among NFs. Each NF involved may introduce an independent timer.

For example, in the Authentication call, the following service requests may be sent, and may be associated with the following timers:
UE sends a REGISTRATION REQUEST to AMF (UE wait timer: 15 seconds)
AMF sends a Nnrf_NFDiscovery request to NRF (wait time configure in the AMF: 5 second)
AMF sends an authentication request to AUSF (wait time configure in the AMF: 5 second)
AUSF sends an authentication request to UDM (wait time configure in the AUSF: 5 second)
UDM sends an authentication request to UDR (wait time configure in the UDM: 5 second).
Thus in this example, five different timers may be employed for a single service request from UE to AMF. If an SCP is also involved in between each NFs, there may be an additional SCP wait timer, which for example may be a further 5 seconds.

If any of the NF does not respond within the specified timer duration, for example due to congestion at the respective NF or different NFs, a timeout may occur. This may cause the entire service request chain to retry from the beginning, involving multiple NFs. This may result in inefficient network operation.

Different network operators may customize timers at each NFs to try and address this issue. However, configuring each timer at each NF with the right value may be impractical.

3GPP has also specified that network functions may support HTTP custom headers. Table 5.2.3.3-1 of 3GPP TS 29.500 defines several HTTP custom headers, which includes the following provided in Table 2 below:

| Name | Reference | Description |
|---|---|---|
| 3gpp-Sbi-Sender-Timestamp | Clause 5.2.3.3.2 | This header may be used to indicate the date and time (with a millisecond granularity) at which an HTTP request or response is originated. This may be used e.g. for measuring signalling delays between different NF service instances. |
| 3gpp-Sbi-Max-Rsp-Time | Clause 5.2.3.3.3 | This header may be used in a HTTP request to indicate the duration during which the HTTP client waits for a response. See clause 6.11.2. |

One possibility for configuring timers with each NF is to use the 3gpp-Sbi-Max-Rsp-Time header. This header may allow a NF to ask other NFs to respond within the time duration set by the header. For example, an AMF can send this header to AUSF with the value 10 seconds, expecting that the AUSF should respond back within 10 seconds.

However, this approach may not be aware of the network conditions, delay or failure of the paths utilized. As such, this approach may not address the issue of what should be the best transaction wait-time. For example, the AMF may not be aware of network conditions or delay to the AUSF, and may set a response time in the header of 10 seconds, while the AUSF may be unable to respond in the 10 seconds due to the network conditions and/or delay.

In some cases, the service request and response messages exchanged among NFs in a procedure may depend on the network congestion level. It may be the case that the delay varies among different cases, since the delay may be proportional to the network load.

If the delay is greater than the network defined wait time at the NFs, then the network/NFs may retry sending the request again. This may be avoided if the network can predict the actual delay timer corresponding to the network conditions.

3GPP has defined analytics-based engine, such as a Network Data Analysis Function (NWDAF), Management Data Analytics Function (MDAF), or Management Data Analytics Service (MDAS) Management Service (MnS) producer. These analytics-based engines may have several applications for helping optimize network behaviour. For example, an analytics-based engine such as an NWDAF may be used to predict UE mobility behaviour and fine tune the mobility management parameters, e.g., the registration areas and the right value of UE registration timer in the AMF periodically.

For example, the NWDAF may resolve congestion at the AMF when several UEs send registration and keep alive messages, by creating a policy that identifies such UEs that send excessive singling and creating a throttling policy to drop such singling packets in order to avoid congestion at the AMF. A MDAS MnS producer may be used to assist other management services to scale up or scale in/out NFs, which are congested due to excessive signaling, such as the AMF.

Thus, an analytics-based engine may predict the network load and/or congestion situations of a certain path or NF or site or domain or slice. In some cases, it may be beneficial to tune or adjust the NF level timers based on the output of analytics.

Figures 4A, 4B:
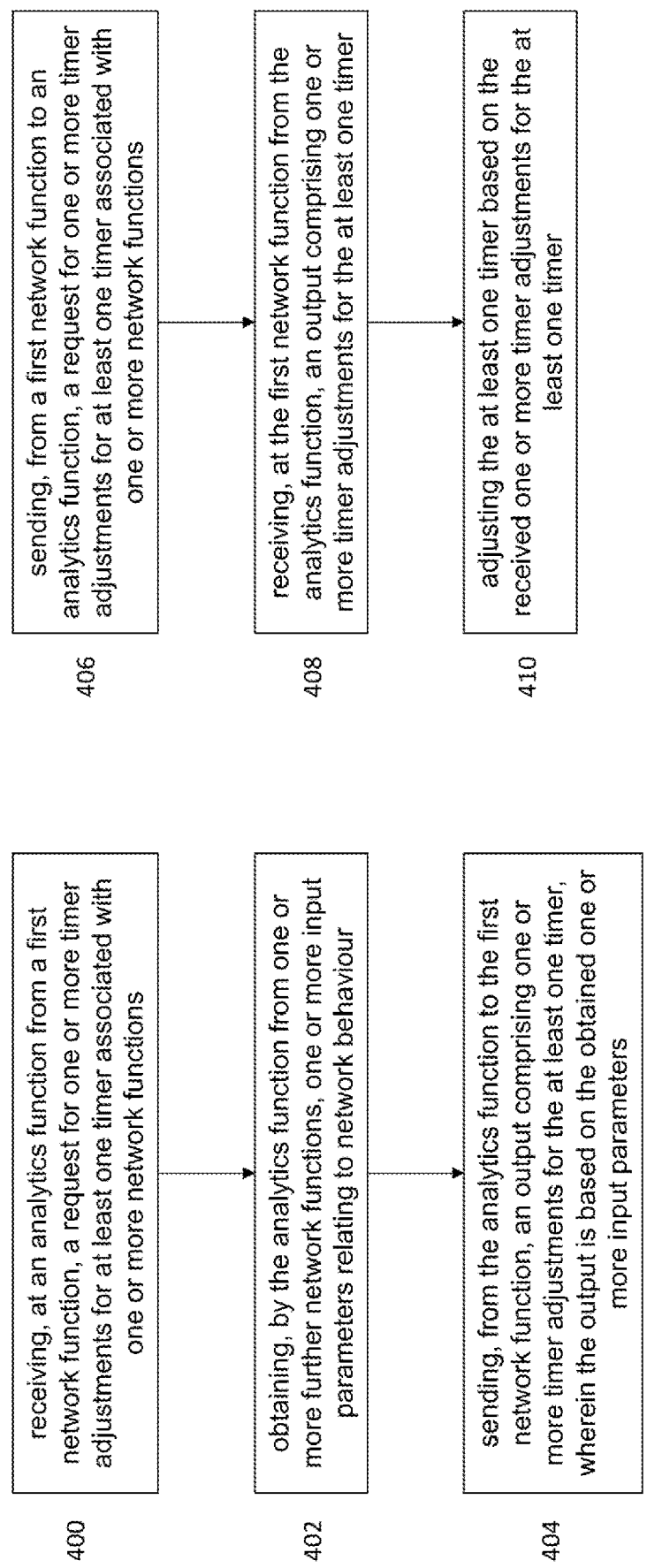
FIGS. 4*a* and 4*b* show a method according to some examples.

Reference is made to FIGS. 4a and 4b, which show a method according to some examples.

FIG. 4a shows a method which may for example be performed by an analytics function.

At 400, the method comprises receiving, at an analytics function from a first network function, a request for one or more timer adjustments for at least one timer associated with one or more network functions.

At 402, the method comprises obtaining, by the analytics function from one or more further network functions, one or more input parameters relating to network behaviour.

At 404, the method comprises sending, from the analytics function to the first network function, an output comprising one or more timer adjustments for the at least one timer, wherein the output is based on the obtained one or more input parameters.

FIG. 4b shows a method, which may for example be performed by a network function such as an OAM.

At 406, the method comprises sending, from a first network function to an analytics function, a request for one or more timer adjustments for at least one timer associated with one or more network functions.

At 408, the method comprises receiving, at the first network function from the analytics function, an output comprising one or more timer adjustments for the at least one timer.

At 410, the method comprises adjusting the at least one timer based on the received one or more timer adjustments for the at least one timer.

In some examples, there may be a default value for a timer associated with a NF, such as the retry timer and timeout timer. The analytics-based engine (hereinafter referred to as the MDAS MnS producer, but it should be understood that any such analytics based engine, such as the Network Data Analysis Function (NWDAF) or Management Data Analytics Function (MDAF) mentioned previously may be used instead of or along with the MDAS MnS producer) may collect information relating to one or more NFs in a chain related to a particular procedure. When a certain threshold related to a network condition, such as network load, is met, the MDAS MnS producer may adjust a value of the timer for an associated NF. For example, an output of the MDAS MnS producer may be used to tune or adjust the default value of the timer associated with the NF. In some examples, when a first threshold condition is reached (e.g. network load=X), the timer may be adjusted by a first value, and when a second threshold is condition is reached (e.g. network load=X+Y), the timer may be adjusted to a second value.

For example, if a site or an NF is un-operational, then the timer may be adjusted at other NFs in the chain. The timers may be adjusted up to a certain upper bound limit related to the expected Service Level Agreement, which the network operator may calculate. A policy to prioritize and/or an orchestration procedure to scale up resources may then be implemented with the objective to meet the target upper bound limit for the timer(s).

In some examples, the MDAS MnS producer may also perform a root cause analysis to identify the root issue, e.g. radio conditions, network congestion, congestion peaks and/ or the like that may be the cause of the network condition reaching the threshold, e.g. excessive signalling delay. The MDAS MnS producer may then suggest, based on the analysis, one or more actions to take, such as timer adjustment, where to scale up based on expected timer delay, time schedule, i.e. when to retry the service request, etc.

In some examples, an Operations, administration and management (OAM) function may subscribe to the MDAS MnS producer. The MDAS MnS producer may predict a suitable retry-timer and timeout value for a NF. The prediction may consider specific procedures, e.g. registration, where a certain chain of NF interactions takes place.

The MDAS MnS producer can in some examples receive one or more of the following information:
PM/KPI data, such as data related to network load, site load, site up/down (e.g. if the site is down for a time, PM/KPI data may be generated indicating that the site is down);
Information relating to an NF chain associated with a service request, for example NF List (UDM1, AMF1 . . . ) per site (Site1); and
Range of the timer(s) for each NF, such as an upper and lower limit of the timer(s).

The MDAS MnS producer may predict timer values as applicable to different sets of NFs, sites, inter-site communications based on the received information and provide the predicted timer values as an output to the OAM.

The MDAS MnS producer may also generate one or more of the following:
the time of the day, so as to reduce the retries and improve the success rate;
a retry count schedule; and
timer values between the sites (e.g. Locality1 NF is accessing the NFs of locality2 the timeout timer=10 seconds).

If the network conditions change, the MDAS MnS producer may determine updated predicted timer values, and update the OAM accordingly.

The OAM (and in particular a logical entity that is a part of the OAM, which is responsible for configuring NF timer values) may use the MDAS MnS producer's prediction to configure the NFs. For example, the OAM can configure the UDM with timeout value and retry count.

As a result, signalling across the network due to retries may be reduced, as the timer values (and in particular the transaction wait timer and retry timer values) may be dynamically adjusted according to a predicted timer value derived based on information relating to network conditions.

Figure 5:
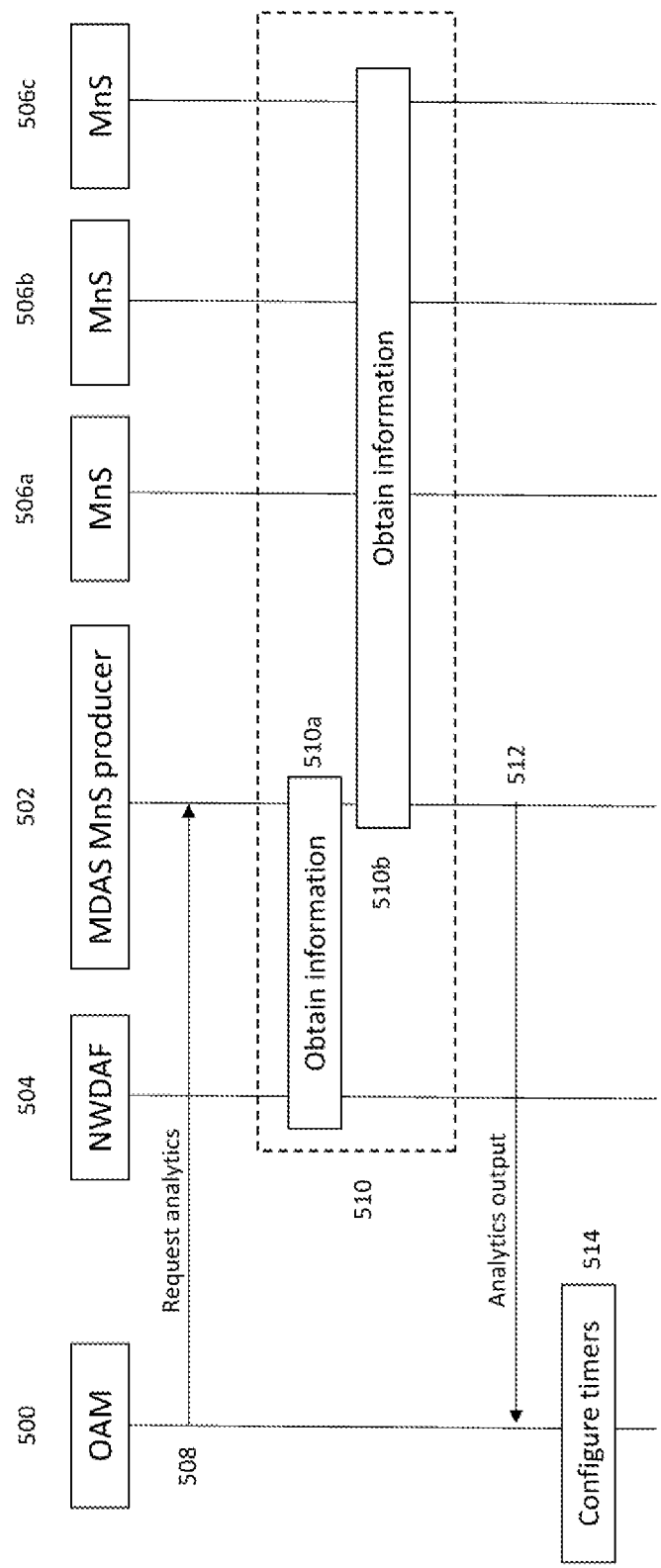
FIG. 5 shows a signalling exchange according to some examples.

Reference is made to FIG. 5, which shows a signalling exchange according to some examples. In the example of FIG. 5, OAM 500 acts as a MDAS MnS consumer. However, it should be understood that in some examples, another NF may act as a MDAS MnS consumer.

At step 508, OAM 500 sends a request for analytics to an MDAS MnS producer 502. The request may comprise a request for one or more timer adjustments.

The OAM may be responsible for configuring NF timer values. In some examples, a logical entity that is part of the OAM may be responsible for configuring the NF timer values.

In some examples, the MDAS consumer, which may be the OAM 500, may request analytics with particular conditions. The conditions may for example include particular reporting times, filters etc. from the MDAS MnS producer 502 for a particular NF or NF chain providing the range of timers and the flow ID.

In some examples, the request may comprise a Management Object Instance (MOI). The MOI contain different parameters which may enable the OAM 500 to request the particular capabilities of the analytics.

In some examples, a chain of NFs may be considered. A chain of NFs may comprise a plurality of NFs. To perform a procedure initiated by a first NF, each of the NFs in chain may perform one or more subsequent operations. That is to say, the chain of NFs may comprise a plurality of NFs associated with a procedure or service operation.

For example, an AMF (first NF) at a first site may need to contact an AUSF or UDM at a second site for authentication/registration (a procedure) of a UE. The AMF may send a message (e.g. authentication request) to a first SCP of the first site, which forwards the message on to a second SCP of the second site, which in turn forwards the request message on to the AUSF/UDM of the second site. Each message transmission (e.g. AMF 1>SCP 1, SCP 1>SCP 2 etc.) may have a timeout timer associated with it, wherein if no response is received after the associated transmission timer expires, the network function either retries the transmission, or selects a new target to send the message to.

Thus, in this example, the AMF, first SCP, second SCP, and AUSF/UDM may be considered as part of a NF chain.

In some examples, the OAM may be configured to provide information indicating an NF chain to the MDAS MnS producer. The MDAS MnS producer may determine the timer values based on the information indicating the NF chain.

In some examples, the information provided to the MDAS MnS producer by the NF requesting the analytics (for example the OAM) may comprise one or more of the inputs listed in table 3 below. In some example, MDAS MnS can retrieve the configured timer values from the OAM.

TABLE 3

| Input | Description |
| --- | --- |
| Flow ID | Flow Id: Authentication, Registration, Request/Response between the sites |
| Chained NFs with locality (site details) Example: AMF (site1) SCP1 (site 1) SCP2 (site 2) AUSF/UDM (site 2) | Chains NFs and corresponding site (locality description) |
| TimeoutTimerRange Example: 2 second to 15 seconds | Range of the timeout Timer applicable for the flow. May be decided by the initiator NF(s) based on different parameters. For example: AMF can decide it for the authentication flow considering UE will wait not more than 15 seconds NF can decide based on previous received timer value |
| RetryTimerRange Example: 2 second to 5 seconds | Range of the retry Timer values applicable for the flow |
| Number of retry attempts range Example: 1 . . . 5 | Range of number of retry attempts |
| UE behavior Type Example: IOT device Normal UE (mobility UEs) MICO NR life (RedCap devices) | Input identifying the type of UE behaviour. Different flow Id may be used for different device type(s) |

TABLE 3-continued

| Input | Description |
| --- | --- |
| Retry/failure count/KPIs Site failure/route failure Site overloaded/NF overloaded | Retry/failure count at the NF or Site level Route failure or site failure or NF failure Site/NF overload KPIs |

At step 510, the MDAS MnS producer 502 collects information for producing the analytics.

In some examples, step 510 may comprise obtaining the information from NWDAF 504, as indicated by step 510a in FIG. 5. NWDAF 504 may provide information, such as UE mobility, that can be used by MDAS MnS producer 502 predict aggregate UE movements that can be related with the expected load at particular NFs. In some examples, service experience can optionally be used to predict QoS sustainability, which can also be related to expected load.

Additionally or alternatively, step 510 may comprise obtaining the information from one or more MnSs 506a-c, as indicated by step 510b in FIG. 5. The one or more MnSs 506a-c may provide information such as PMs/KPIs related with NF load, throughput, network congestion, etc., to the MDAS MnS producer 502. Furthermore, in some examples MnSs 506a-c may provide information relating to site/NF overload, retry/failure KPIs at NF/sites and site/route failure.

In some examples, the MDAS MnS producer may collect different input parameters related to the NF(s) and/or site(s). The MDAS MnS producer may use the collected inputs for producing the analytics. Table 4 below shows some examples of different parameters that may be collected, and some examples of NFs where the parameters may be collected from. It should be understood that this list of parameters is not exhaustive, and that in some examples other parameters and/or other NFs may provide the parameters than listed below.

TABLE 4

| Collect | From | Description |
| --- | --- | --- |
| Network load | OAM (MnS) | Network load information (for example as per TS 28.552/TS 28.554) |
| Slice load | OAM (MnS) | NF load, throughput, network congestion, Slice load where UE is attached (for example as per TS 28.552) |
| Expected UE Behaviour analytics | NWDAF | Expected UE Behaviour analytics, UE mobility, service experience (for example as per TS 23.288) This may use Nnwdaf_AnalyticsSubscription_Transfer |
| RAN Load | OAM (MnS) | RAN congestion, throughput, load (for example as per TS 28.552) |
| Average Number of Failure at NF | OAM (MnS) | Average number of failure due to timeout |

At step 512, MDAS MnS producer 502 prepares and provides an output to the OAM 500 based on the received information.

In some examples, MDAS MnS producer 502 performs analysis on the collected information (i.e. one or more input parameters) to determine one or more timer adjustments for the at least one timer. The one or more timer adjustments may be included in the output to the OAM. The one or more timer adjustments may comprise one or more adjusted timer values (for example, one or more adjusted timer values for a timeout timer and/or a retry timer) and/or an adjusted number of retry attempts.

The one or more recommended timer adjustments for one or more timers may be determined by any suitable method, for example based on AI/ML.

When the OAM provides a range of timer values (e.g. TimeoutTimerRange or RetryTimerRange in Table 3) and/or a range for a number of retry attempts (e.g. Number of retry attempts range in Table 3), in some examples the MDAS MnS producer 502 may determine the one or more recommended timer adjustments value based on the range. Thus, for example, the adjusted timer value determined by the MDAS MnS producer 502 may be within the received range.

The output may comprise an MDAS report. The output may be provided when the conditions (e.g. the reporting times, filters etc.) set by the OAM are met. The output may comprise one or more recommended timer adjustments for one or more timers associated with a NF or site or inter-site communications.

In some examples, the output may be provided per NF type, per NF ID, or per Site ID. In some examples the output may be provided for more than one NF type, NF ID, or Site ID. For example, the output may be provided for inter-site communications.

Table 5 below shows some examples of different parameters that may be included in the output from the MDAS MnS producer. It should be understood that this list of parameters is not exhaustive, and that in some examples other parameters may be included in the output.

TABLE 5

| Output per sites/per inter site communication | Description |
|---|---|
| Applicability Example: Option1: inter-site basis Option2: NFtype basis Option3: node/NF basis Option4: Location Option5: Time of the day | Different timers value(s) may be applicable for different scenarios. |
| Applicability Example: Time Day | Timers may be applied at this range of time/day |
| TimeoutTimerTunnedValue | Predicted adjusted timer value(s) and/or range of timer values for the timeout timers |
| RetryTimerTunnedValue | Predicted adjusted timer value(s) and/or range of values for the retry timers |
| RetryCount | Predicted adjusted value of retry attempts per NF |
| Confidence Degree | Percentage that the predicted values are within the indicated range. |

In some examples, the MDAS MnS producer may keep on calculating the timers values and/or range of values based on different information, such as KPIs, received from the MnSs/NFs. The different information may, for example, indicate one or more of site failure/NF failure, overload at the NFs/Site, failure count increase at the NFs, or failure increase at the sites.

These inputs and/or variation of input may cause the MDAS MnS producer to recalculate the timers and provide the adjusted timers and/or range of values for the relevant communication.

At step 514, the OAM configures at least one timer value for at least one NF based on the output received from the MDAS MnS producer. For example, based on the output received from the MDAS MnS producer, the OAM may send a message containing a timer value to a NF, which causes the NF to use the timer value for the timer. In some examples, the NF may replace a default value of the timer with the received value.

In some examples, the MDAS MnS consumer, such as the OAM, may use the output from the MDAS MnS producer to configure the timer values in the NFs for different communications or flow IDs.

For example, the AMF may be configured with Flow Id=authentication, AMF site1 and UDM site2, use timeout timer=6 seconds but for Flow Id=request/response, use timeout timer=3 seconds. The AMF may also be configured with Flow Id: PDU session, AMF site1 and SMF Site2, use timeout timer=4 seconds etc.

In some examples, the timer may be configured on a network function type basis and/or an inter-site basis. For example, an inter-site basis may be that a timer is configured for NFa, which is a NF deployed in site-A (such as east zone of the USA), and for NFb, which is a NF is deployed in site-B (such as west zone of the USA). That is to say, in some examples the timer may be configured for multiple NFs at different sites.

Thus examples have been described where an MDAS MnS consumer requests, from an MDAS MnS producer, analytics for predicting adjustments to timers associated with one or more network functions. The MDAS MnS producer may collect information from one or more network functions and provide an output to the MDAS MnS consumer. The output may indicate one or more timer adjustment values to be implemented at the associated network function(s). The MDAS MnS consumer may then implement the adjusted timer values. This may reduce the number of errors or operation timeouts occurring in the network, and thereby reduce the signalling across the network due to having to retry an operation. As such, some examples may result in improved network efficiency.

In some examples, there is provided an apparatus comprising means for receiving, at an analytics function from a first network function, a request for one or more timer adjustments for at least one timer associated with one or more network functions; obtaining, by the analytics function from one or more further network functions, one or more input parameters relating to network behaviour; and sending, from the analytics function to the first network function, an output comprising one or more timer adjustments for the at least one timer, wherein the output is based on the obtained one or more input parameters.

The apparatus may for example comprise at least one processor and at least one memory including a computer program code, the at least one memory and computer program code configured to, with the at least one processor, cause the apparatus at least to: receive, at an analytics function from a first network function, a request for one or more timer adjustments for at least one timer associated with one or more network functions; obtain, by the analytics function from one or more further network functions, one or more input parameters relating to network behaviour; and send, from the analytics function to the first network function, an output comprising one or more timer adjustments for the at least one timer, wherein the output is based on the obtained one or more input parameters.

In some examples, there is provided an apparatus comprising means for sending, from a first network function to an analytics function, a request for one or more timer adjustments for at least one timer associated with one or more network functions; receiving, at the first network function from the analytics function, an output comprising one or more timer adjustments for the at least one timer; and adjusting the at least one timer based on the received one or more timer adjustments for the at least one timer.

The apparatus may for example comprise an apparatus comprising at least one processor and at least one memory including a computer program code, the at least one memory and computer program code configured to, with the at least one processor, cause the apparatus at least to: send, from a first network function to an analytics function, a request for one or more timer adjustments for at least one timer associated with one or more network functions; receive, at the first network function from the analytics function, an output comprising one or more timer adjustments for the at least one timer; and adjust the at least one timer based on the received one or more timer adjustments for the at least one timer.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory storing instructions of an analytics function of a network that, when executed by the at least one processor, cause the apparatus at least to perform:
   receiving, from a an operations, administration and management function of the network, a request for one or more timer adjustments for at least one timer associated with a network function chain associated with a procedure of a network, the network function chain comprising a plurality of network functions;
   obtaining, from one or more further network functions of the network, one or more input parameters relating to network behavior of the network;
   performing analysis of the one or more input parameters relating to behavior of the network to determine whether a threshold related to the network behavior is reached, and to determine the one or more timer adjustments for the at least one timer when the threshold is reached; and
   sending, to the operations, administration and management function, a response to the request, the response comprising the one or more timer adjustments for the at least one timer.

2. The analytics function of claim 1, wherein the one or more timer adjustments comprises at least one of the following:
   one or more adjusted timer values; or
   one or more adjusted number of retry attempts for sending at least one message associated with the at least one timer.

3. The analytics function of claim 1, wherein the one or more further network functions comprises one or more of the following:
   a network data analytics function; or
   a network management service.

4. The analytics function of claim 1, wherein the one or more input parameters comprise at least one of the following:
   information indicating a network load of the network;
   information indication a load of a network slice of the network that a user equipment is attached;
   information indicating expected user equipment behavior;
   information indicating a load of a radio access node of the network; or
   information indicating an average number of failed attempts to send a message from a network function of the one or more network functions due to timeout.

5. The apparatus of claim 1, wherein the at least one timer is configured on a network function type basis or an inter-site basis.

6. An apparatus for operation, administration, and management of a network, the apparatus comprising:
   at least one processor; and
   at least one memory storing instructions that, when executed by the at least one processor, cause the apparatus at least to perform:
   sending, to an analytics function of the network, a request for one or more timer adjustments for at least one timer associated with a network function chain associated with a procedure of a network, the network function chain comprising a plurality of network functions of the network;
   receiving, from the analytics function, the one or more timer adjustments for the at least one timer, wherein the one or more timer adjustments is determined when a threshold related to network behavior is reached; and
   configuring at least one timer value for at least one network function of the plurality of network functions in the network function chain based on the received one or more timer adjustments for the at least one timer.

7. The apparatus of claim 6, wherein the one or more timer adjustments comprises at least one of:
   one or more adjusted timer values; or
   one or more adjusted number of retry attempts for sending at least one message associated with the at least one timer.

8. The apparatus of claim 7, wherein the adjusting configuring:
   sending, to the at least one network function of the plurality of network functions, configuration information comprising one of the one or more adjusted timer values or one of the one or more adjusted number of retry attempts.

9. The apparatus of claim 6, wherein the request for analytics comprises at least one of the following:
   information identifying a service flow associated with the network procedure, the network procedure involving the one or more network functions of the network function chain;
   information identifying the plurality of network functions of the network function chain;
   information identifying a range of the at least one timer;
   information identifying a range of retry attempts for at least one message associated with the network procedure;
   information identifying a type of user equipment associated with the network procedure;
   information identifying a number of retry attempts at a network function of the one or more network functions of the network function chain;
   information identifying at least one of a route failure, a site failure, or a network function failure; or
   information identifying one or more overloaded network functions or overloaded sites key performance indices.

10. The apparatus of claim 6, wherein the at least one timer comprises at least one of the following:
    a timeout timer; or
    a retry timer.

11. The apparatus of claim 6, wherein the output comprises at least one of the following:
    information indicating one or more scenarios where the one or more timer adjustments for the at least one timer are applicable;
    information indicating a time where the one or more timer adjustments for the at least one timer are applicable;
    information indicating a day where the one or more timer adjustments for the at least one timer are applicable; or
    information indicating a degree of confidence that the one or more timer adjustments for the at least one timer are within an indicated range.

12. A method of an analytics function of a network, comprising:
    receiving, from an operations, administration and management function of the network, a request for one or more timer adjustments for at least one timer, wherein each respective timer is associated with a network function of a plurality of network functions of a network function chain associated with a procedure of the network;

obtaining, from one or more further network functions of the network, one or more input parameters relating to network behavior of the network;

performing analysis of the one or more input parameters relating to behavior of the network to determine whether a threshold related to the network behavior is reached, and to determine the one or more timer adjustments for the at least one timer when the threshold is reached; and sending, to the operations, administration and management function, a response to the request, the response comprising the one or more timer adjustments for the operations, administration and management function to configure the at least one timer.

13. A method for operation, administration, and management of a network, the method comprising:

sending, to an analytics function of the network, a request for one or more timer adjustments for at least one timer, each timer of the at least one timer is associated with a network function of a plurality of network functions of a network chain associated with a procedure of the network;

receiving, from the analytics function, the one or more timer adjustments for the at least one timer, wherein the one or more timer adjustments is determined when a threshold related to network behavior is reached; and configuring the at least one timer value for at least one network function of the plurality of network functions in the network function chain based on the received one or more timer adjustments.

14. A non-transitory computer-readable medium comprising instructions of a network function analytics that, when executed by an apparatus, cause the apparatus to perform:

receiving, from an operations, administration and management network function of the network, a request for one or more timer adjustments for at least one timer, wherein each respective timer is associated with a network function of a plurality of network functions of a network function chain associated with a procedure of the network;

obtaining, from one or more further network functions of the network, one or more input parameters relating to network behavior of the network;

performing analysis of the one or more input parameters relating to behavior of the network to determine whether a threshold related to the network behavior is reached, and to determine the one or more timer adjustments for the at least one timer when the threshold is reached; and sending, to the operations, administration and management function, a response to the request, the response comprising the one or more timer adjustments for the operations, administration and management function to configure the at least one timer.

15. A non-transitory computer-readable medium comprising instructions that, when executed by an apparatus, cause the apparatus to perform:

sending, to an analytics function of the network, a request for one or more timer adjustments for at least one timer, each timer of the at least one timer is associated with a network function of a plurality of network functions of a network chain associated with a procedure of the network;

receiving, from the analytics function, the one or more timer adjustments for the at least one timer, wherein the one or more timer adjustments is determined when a threshold related to network behavior is reached; and configuring at least one timer value for at least one network function of the plurality of network functions in the network function chain based on the received one or more timer adjustments.

16. The method of claim 12, wherein the one or more timer adjustments comprises at least one of the following:

one or more adjusted timer values; or one or more adjusted number of retry attempts for sending at least one message associated with the at least one timer.

* * * * *